United States Patent [19]
Jacobs et al.

[11] Patent Number: 5,802,032
[45] Date of Patent: Sep. 1, 1998

[54] METHOD AND DEVICE FOR RECORDING A MARK HAVING A SUBSTANTIALLY CONSTANT NUMBER OF PULSES PER UNIT LENGTH INDEPENDENT OF WRITING SPEED ON AN OPTICAL INFORMATION CARRIER

[75] Inventors: Bernardus A.J. Jacobs; James H. Coombs; Johannes H.M. Spruit; Johan P.W.B. Duchateau; Guofu F. Zhou, all of Eindhoven, Netherlands

[73] Assignee: U.S. Philips Corporation, New York, N.Y.

[21] Appl. No.: 800,443

[22] Filed: Feb. 18, 1997

[30] Foreign Application Priority Data

Feb. 16, 1996 [EP] European Pat. Off. .............. 96200387

[51] Int. Cl.$^6$ .................................................. G11B 5/76
[52] U.S. Cl. ................................. 369/59; 369/124
[58] Field of Search ........................ 369/47, 48, 50, 369/54, 116, 59, 13, 124; 360/51

[56] References Cited

U.S. PATENT DOCUMENTS

| | | | |
|---|---|---|---|
| 5,410,522 | 4/1995 | Yokota et al. | 369/47 X |
| 5,457,666 | 10/1995 | Toda et al. | 369/13 |
| 5,559,777 | 9/1996 | Maeda et al. | 369/116 X |
| 5,590,111 | 12/1996 | Kirino et al. | 369/116 |

FOREIGN PATENT DOCUMENTS

3283021  12/1991  Japan.

*Primary Examiner*—Paul W. Huber
*Attorney, Agent, or Firm*—Edward Blocker

[57] ABSTRACT

A method is described for recording an optical information carrier, in which marks representing recorded data are written at different writing speeds by radiation pulse of equal length and power, independent of the writing speed. The number of pulses per unit length of the written mark is a constant independent of the writing speed.

13 Claims, 3 Drawing Sheets

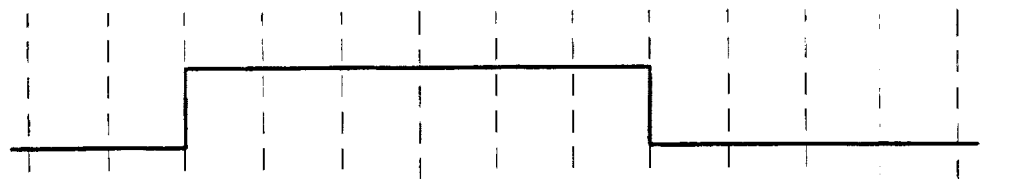
FIG. 4a
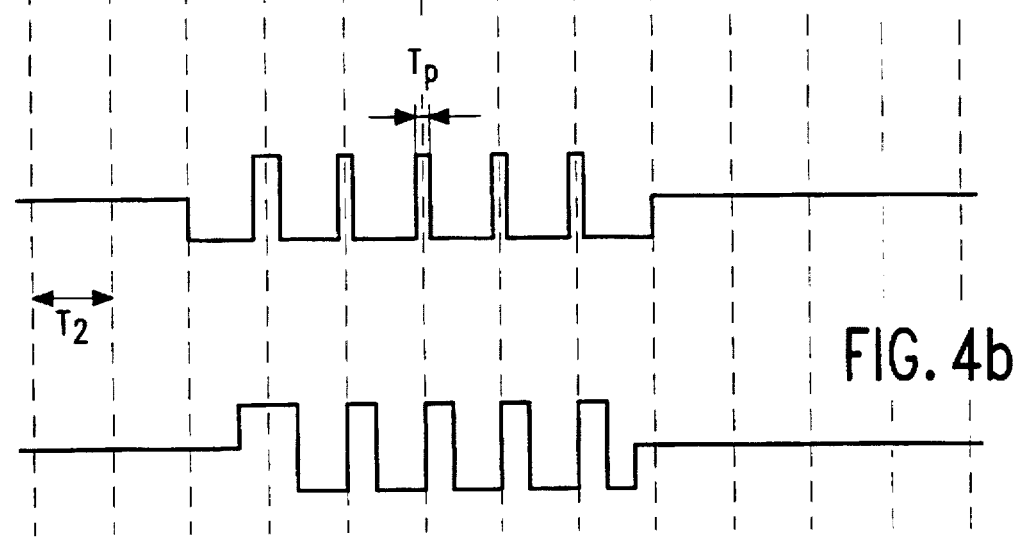
FIG. 4b
FIG. 4c
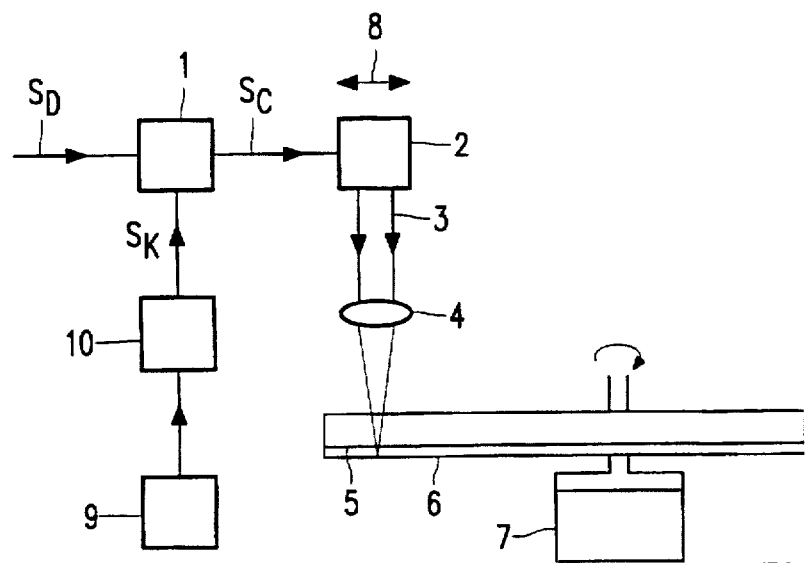
FIG. 5

5,802,032

METHOD AND DEVICE FOR RECORDING A MARK HAVING A SUBSTANTIALLY CONSTANT NUMBER OF PULSES PER UNIT LENGTH INDEPENDENT OF WRITING SPEED ON AN OPTICAL INFORMATION CARRIER

BACKGROUND OF THE INVENTION

The invention relates to a method of recording marks representing data, at different speeds in an information layer of an optical information carrier by irradiating the information layer by a pulsed radiation beam, the pulses having substantial equal pulse width. The invention also relates to a device for carrying out the recording method.

The writing speed is the magnitude of the velocity between the information layer of the information carrier and a spot formed by the radiation beam on this layer. When writing data on an information carrier the writing speed may change as a function of the position of the irradiating beam on the information layer. Changes in writing speed are encountered when writing on a disc-shaped information carrier rotating at a constant angular velocity. This applies both at a radius-independent data rate and at a radially increasing data rate.

A recording method according to the preamble is known from the Japanese patent application nr. JP-A 3-283021. The known method is used to write marks in an information layer at different writing speeds. A disadvantage of the method is that the number of write pulses required for forming a mark of a certain length depends on the writing speed, thereby complicating the control unit which controls the radiation source of the recording device using the method.

SUMMARY OF THE INVENTION

It is an object of the invention to provide a recording method which requires a relatively simple control unit for its implementation and provides a reliable recording at different writing speeds.

This object is achieved when the method of the preamble is characterized in that a mark is written by a substantially constant number of pulses per unit of length of the mark independent of the writing speed. The control unit can be simple, because the number of write pulses for forming a mark of a certain length need not be changed when the writing speed is changed. The combination of a substantial constant pulse width and an equal number of pulses per unit of length of the mark provides an equal amount of radiation energy deposited per unit of length, resulting in the formation of marks which have a width independent of the writing speed. The method is very suitable for writing marks which can only have a discrete number of lengths, for instance a length equal to an integer times a so-called channel-bit length. The number of write pulses for such a mark will then preferably be equal to the number of channel-bit lengths minus one or two.

In a preferred embodiment of the method according to the invention the pulse period is substantially inversely proportional to the writing speed. Small variations in the number of pulses per unit of length of a mark are possible in embodiments where a disc-shaped carrier rotating at constant angular velocity is divided is several zones, each of which is written at a constant angular density and zones at increasing radii are written at increasing angular density.

The constant number of write pulses per unit of length and the equal width of the pulses does not apply to the leading and trailing edge of a mark. These edges, comprising together approximately one to two channel-bit lengths, form transient phenomena which are dealt with in special embodiments of the method according to the invention.

The pulses are preferably synchronized to a data clock signal, the frequency of which depends on the writing speed. When the frequency of the data clock is proportional to the writing speed, a substantially constant linear information density on the information layer can be realized. A coupling of the timing of the pulses to the data clock enables the proper formation of marks at all writing speeds. The coupling can be realized in the control unit by simple electronic means.

A further simplification of the control unit can be achieved by maintaining the power in the pulses substantially at a predetermined write level, independent of the writing speed and the lengths of the marks.

At relatively large speed differences, the write power preferably increases with decreasing write speed. The write power preferably has a linear dependence on the write speed. The advantage of this dependence is already noticeable at speed changes of a factor 1.5. A decrease of the writing speed by a factor of two and a half and an associated increase of the write power in the range from 5% to 25% improves the write performance. The higher power compensates the increased cooling at low speeds due to the low duty cycle.

The writing of marks can be combined with simultaneous erasing of previously written marks by setting the irradiating power at an erase level when no marks are written. For an accurate definition of the leading and trailing edge of the written mark, the erase power is preferably switched off immediately before or at a well-defined instant of time before a mark is being written and switched on after the mark has been written in the way as specified in the claims.

It is to be noted that the advantageous embodiments of the write strategy described hereinbelow and specifically in claims 2, 3 and 5 to 11 can also be used in a write strategy using a single, fixed writing speed.

BRIEF DESCRIPTION OF THE DRAWINGS

The invention will now be described with reference to the drawings, in which,

FIGS. 4a, 4b, and 4c are diagrams illustrating the time-dependence of various signals at a low writing speed, and FIG. 5 shows a recording device according to the invention.

DESCRIPTION OF THE PREFERRED EMBODIMENTS

Figure 1A:
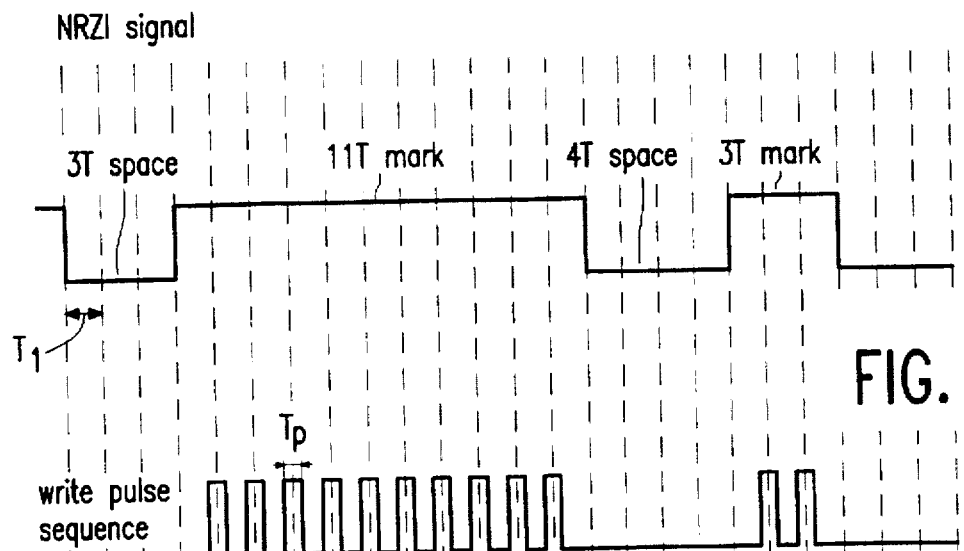
FIGS. 1a, 1b, 1c and 1d are diagrams illustrating the time-dependence of various signals according to the invention at a high writing speed.

FIGS. 1a–1d are time diagrams illustrating various signals which will be used in the explanation of the recording method according to the invention. FIG. 1(a) shows the value of a digital data signal as a function of time. The vertical dashed lines indicate transitions in a clock signal of a data clock belonging to the data signal. The period $T_w$ of the data clock, also called the channel-bit period, is indicated by $T_1$. The data signal changes value from 'high' to 'low' and 'low' to 'high' at transitions of the data clock. The data signal can be a so-called EFM coded signal, which can be 'low' for periods from 3 $T_1$ to 11 $T_1$ and 'high' also for periods from 3 $T_1$ to 11 $T_1$. When recording the data signal, a 'high' period is recorded as a mark having a length corresponding to the duration or width of the 'high' period, and a 'low' period is recorded as an unwritten area between marks and having a length corresponding to the duration or width of the 'low' period.

The data is written in an optical information carrier having an information layer. The marks representing the data are written along a track in the information layer by a radiation beam. The marks are areas of the information layer having optical characteristics different from their surroundings, which makes optical reading of the marks possible. The length of a mark written in the information layer is substantially equal to the number of channel-bit periods of the data signal times the writing speed. The length of a mark can be expressed in channel-bit lengths, one channel-bit length being equal to one channel-bit period times the writing speed.

Figure 1B:

FIG. 1(b) shows the sequence of write pulses used for modulating a radiation beam with which the data signal is written on the information layer. The pulses have an equal width $T_p$ and a pulse period of $T_w$. The centres of gravity of the pulses in the Figure are located at the transitions of the data clock. The accuracy of centring of the pulses on the clock transitions is preferably within a range of +/− $T_p$/5. A 'high' period of N channel bits in the data signal, a so-called NT mark, is recorded in the embodiment of the recording method shown in FIG. 1 using N-1 write pulses. It is also possible to use N or N-2 write pulses for recording an NT mark. The height of the pulses corresponds to a write power of the radiation beam.

Figure 1C:

FIG. 1(c) in shows the erase signal modulating the radiation beam such that previously written marks in between marks to be written are erased. The erase signal drops from 'high' to 'low' at the rising edge of the first write pulse for writing a mark and from 'low' to 'high' at the trailing edge of the data signal. The erase signal is shown as having a continuous 'high' level during periods of several channel-bit periods. However, the erase signal may also comprises a series of short pulses during these periods.

Figure 1D:
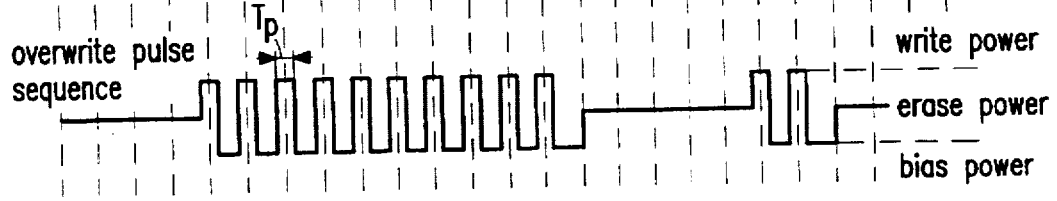

FIG. 1(d) shows the control signal used as input for a radiation source generating the radiation beam which has a power proportional to the amplitude of the control signal. The control signal is composed of the write pulses in trace (b) and the erase pulses in trace (c). The highest level of the control signal corresponds to the write level of the radiation beam, the middle level of the trace to an erase level and the lowest level of the trace to a bias level.

A sequence of pulses for writing a mark may be represented by the notation K-L(M) in which K and L are numbers giving the width of the first and last pulse respectively in the sequence in units of channel-bit periods and M is an integer giving the number of pulses in a sequence for writing an NT mark. A sequence comprises a number of write pulses having a width of $T_p$ between the first and last pulse; the number depends on the length of the first and last pulse and the length of the mark to be written. The two pulse sequences in trace (d) comprising 10 and 2 pulses of width $T_p$ can be represented by 0.5-0.5(N-1). The marks written by such sequences show a low jitter value on reading.

The first write pulse for a mark in FIG. 1(d) is not preceded by another write pulse as is the case for write pulses in the middle of a sequence. Hence, the information layer is not pre-heated by a preceding pulse when the first write pulse is incident on the information layer. This could cause a lower temperature of the layer and a smaller width of the mark near the leading edge. This transient phenomenon is solved in the recording method shown in FIG. 1(d) by maintaining the erase level up to the start of the first write pulse, thereby pre-heating the information layer by the erase pulse. If more preheating is required, the level of the first pulse of a write sequence may be increased. Alternatively, the width of the first pulse may be increased. A width equal to twice the width of the following pulses in the sequence may provide a reliable recording. The pulse sequence is then 1-0.5(N-1). The longer width of the first pulse is preferably combined with maintenance of the erase level up to the start of the first pulse.

A write pulse sequence requiring a relatively low write power is 1.5-0.5(N-2). This sequence contains 9 pulses for writing an 11T mark.

The quality of the written marks may be improved by increasing the width of the last pulse of a sequence. The extra energy deposited at the rear of the mark improves the erasure of previously written marks at that location. The width of the last pulse is preferably between 0.6 and 1.5 channel-bit periods. When used for writing information on a phase-change information layer, the width of the last pulse is preferably between 0.6 and 0.75 for phase-change layers having a relatively short crystallization time, i.e. shorter than 40 ns, and preferably between 1 and 1.5 for phase-change layers having a relatively long crystallization time, i.e. longer than 100 ns. An example of a sequence having a longer last pulse is 0.5-X(N-1) with X between 0.6 and 1.5 channel-bit periods. A more symmetrical sequence is 1.0-1.0(N-2).

The bias level in the above pulse sequences corresponds to a relatively low power of the radiation beam between the write pulses, allowing a rapid cooling of the information layer after irradiation by a write pulse. The bias level may be equal to the erase level. However, it is preferably smaller than 70% of the erase level. The erase level is a predetermined power at which information previously written on an information carrier can be erased. An optical recording device may obtain the erase power from reading a value for the erase power recorded on the information carrier or by making one or more test recordings on the information carrier. A bias power higher than 70% of the erase power causes too much heating after the last pulse of a write sequence. Such a high bias power has as a consequence, that the erasure following the sequence of pulses for writing a mark starts too early and will erase the last part of the just written mark in an ill-defined way. This will increase the jitter when reading the marks. The actual value of the bias power to be chosen in the range from 0 to 70% of the erase level depends on the composition of a particular information carrier and may be determined from the minimum of a jitter versus bias power plot measured on the information carrier or from information recorded on the information carrier relating to recording parameters. Experiments have shown that a range of carriers from a certain manufacturer required an erase level of 4 mW and a bias level of 1.6 to 1.9 mW, i.e. smaller than 50% of the erase level. A range of carriers from another manufacturer had optimum overwrite characteristics at a bias level of 0 mW. For some information carriers the optimum bias level may be equal to the read level. A bias level below the optimum value gives an increase of the jitter caused by the rear edge of the marks, probably because then previously written marks immediately after the just written mark are not erased properly.

When the bias power is larger than zero, it also gives some preheating for the next write pulse, reducing the write power required in the write pulses.

The first pulse in the sequence shown in FIG. 1(d) of starts from the erase level. However, the sequence, and also the other mentioned sequences, may start from the bias level. The bias level period preceding the first pulse is preferably shorter than one channel-bit period, in order to properly erase previously written marks just before the mark to be written.

After the last pulse of a sequence the erase power may be switched on immediately to continue the erasure of previously written marks. However, the immediately erasure might affect the rear edge of the just written mark. Therefore, the erase power is preferably switched on a short period after the trailing edge of the last pulse. In the short period the radiation beam is set at a power lower than the erase power. In FIG. 1 the erase power is switched on immediately after the trailing edge of the data signal, thereby leaving a short period with reduced heating between the last write pulse and the erase pulse. The width of this cooling period as shown in FIG. 1(d) of is substantially equal to $T_w-(T_p/2)$. If the erase power were switched on later, the erasure of previously written marks immediately following the just written mark would not be complete. Experiments have shown that the period from the rear edge of the last write pulse to the rising edge of the erase pulse for the above pulse sequences lies preferably in a range from $½ T_w$ to $⅔ T_w$. Within this range the rear-edge jitter of the marks is significantly reduced. A period of $T_w$ appears to be very suitable for writing on information carriers of different manufacturers.

The level of the radiation power in the cooling period may be equal to the bias level, as shown in FIG. 1(d). The erasure immediately after the last pulse of a sequence may be improved while maintaining the proper definition of the rear edge of the just written mark by setting the radiation power during the cooling period to a value in between the bias level and the erase level. In a preferred embodiment the power in the cooling period is set to a value within the range from 25% to 75% of the erase level, the read power is set to approximately 25% of the erase level, and the bias power is set to a value within a range from 0 to 25% of the erase power.

Figure 2:
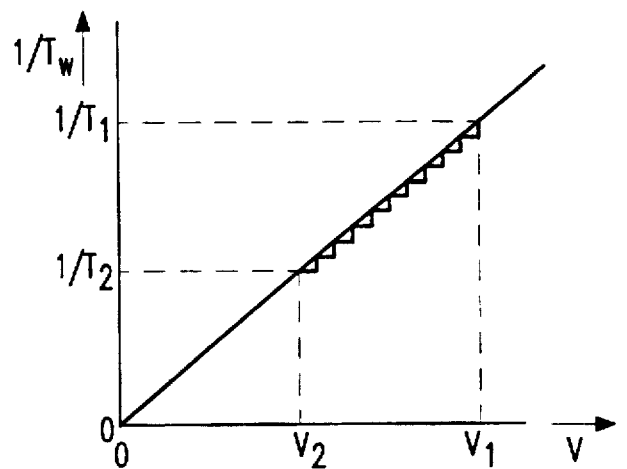
FIG. 2 shows the relation between the channel-bit period and the writing speed.

The influence of changes in the writing speed on the write procedure will now be explained by reference to FIG. 2 for a disc-shaped information carrier rotating at a constant angular velocity and having a substantially constant linear information density. FIG. 2 shows graphically the relation between the writing speed V and the inverse of the channel-bit period $T_w$. When the radiation beam scans a track near the outer radius of the writable area of the disc, the velocity between the information layer of the disc and the radiation beam is relatively high. This speed is called the writing speed and is indicated in FIG. 2 by $V_1$. The channel-bit period $T_w$ belonging to this writing speed is then equal to $T_1$ and is relatively short, as shown in the Figure. When the radiation beam is made to scan a track near the inner radius of the writable area of the disc, the writing speed $V_2$ is smaller than near the outer rim. In order to realize the same linear density of marks along a track, the channel-bit period $T_w$ is made equal to $T_2$, which is longer than $T_1$. This relation is shown in the Figure by a straight line, indicating the proportionality between the writing speed V and the inverse of the channel-bit period $T_w$ or the pulse period. As a consequence, when the writing speed from the outer to the inner radius of the disc decreases for example by a factor of two, the channel-bit period increases substantially by the same factor of two. In other words, the frequency of the data clock increases at increasing radius of the track being written.

A clock circuit which must continuously adapt its frequency to an external parameter, in this case the radius of the track being written, is rather complicated. Therefore, in a special embodiment of the method according to the invention the frequency of the clock is increased in steps when increasing the radius, so the clock circuit can provide a stable clock signal at each step. This step-wise increase is indicated by the staircase line in FIG. 2, the area of the disc between the inner and outer radius is divided in ten zones. Within each zone the frequency of the data clock is constant. A disc divided in zones in this way is called a zoned constant angular velocity (ZCAV) disc. In general the number of zones will be between five and thirty for a radii ratio of two, depending on the compromise made between the highest information density of the information carrier and the lowest number of frequency changes of the data clock. This number of zones guarantees that the data clock frequency and the writing speed are everywhere on the disc close to the optimum relation given by the straight line in FIG. 2. Within a zone the number of pulses per unit of length will slightly decrease at an increasing radius. The number of pulses per unit of length averaged over a zone will be independent of the writing speed. The variation of the number of pulses per unit of length will depend on the speed variations and the number of zones. The variation is ±18% for five zones with a lowest speed of 5 m/s and a highest speed of 12 m/s.

Figure 3A:
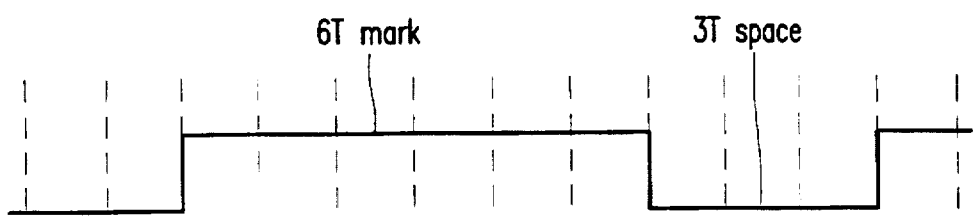
FIGS. 3a and 3b are diagrams illustrating the time-dependence of various signals at a low writing speed.
Figure 3B:
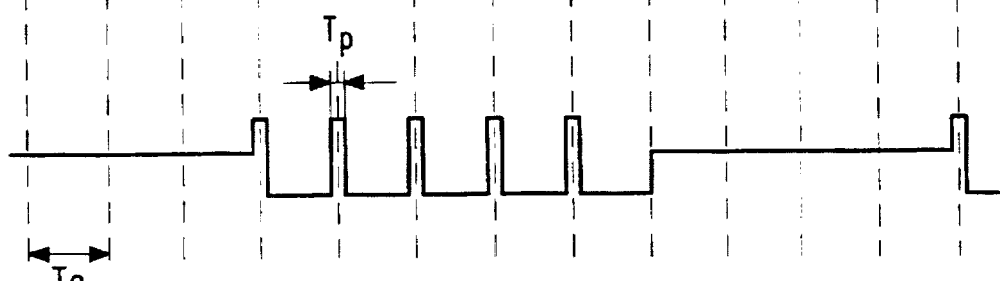

FIG. 1(d) shows a control signal at the outer radius of an information carrier, where $T_1$ is the channel-bit period belonging to the writing speed $V_1$ at the outer radius of the disc. FIG. 3 shows the control signal for the inner radius of the disc. FIGS. 1 and 3 are drawn to the same scale. The frequency of the data clock at the inner radius is about a factor of two lower than at the outer radius. Hence, the channel-bit period $T_2$ at the inner radius is about twice as long as the channel-bit period $T_1$ at the outer radius. FIG. 3(a) shows the data signal with a 'high' period of six channel-bit periods. The appertaining control signal for the sequence 0.5-0.5(N-1) is shown in FIG. 3. The six-channel-bit mark is written by five pulses, their centres of gravity being located at the transitions of the data clock signal indicated by the vertical dashed lines. The width of the pulses is equal to $T_p$, i.e. the same width as the write pulses used near the outer radius. The timing of the switching on and off of the erase power is also the same as near the outer radius. The thermal behaviour of the information carrier is such that an N-channel-bit mark written at the outer radius has substantially the same length and width as an N-channel-bit mark written near the inner radius. The number of write pulses per unit of length of the written mark is thus independent of the writing speed. Hence, this write strategy according to the invention allows to write marks at different writing speeds by changing only the frequency of the data clock. Therefore, the electronic implementation of the control unit can be relatively simple.

When a pulse sequence comprises a first and last pulse having widths different from $T_p$, these widths are not changed when changing the writing speed. The distance between the first pulse and the next pulse and the distance between the one but last pulse and the last pulse have the same dependence on the writing speed as the distance between pulses having a width $T_p$.

FIG. 4(a) and 4(b) shows control signals according to other embodiments of the recording method according to the invention. FIG. 4(a) shows the data signal and in FIG. 4(b) shows the control signal for writing a six-channel-bit mark for the sequence 1.0-0.5(N-1) at a low writing speed, comparable to FIG. 3(b). However, the erase power is switched off at the rising edge of the data signal, i.e. one data clock period plus half a pulse width before the end of the first write pulse. Moreover, the width of the first write pulse is increased by earlier switching on the write power than would be required for a write pulse of width $T_p$, i.e. earlier than $T_p$ before the end of the pulse, which end is at $T_p/2$ after the clock transition of the first pulse. The additional width increases the energy deposited in the information layer at the leading edge of the written mark, thereby compensating for the lack of pre-heating by a pulse preceding this first write pulse. In another embodiment of the recording method the write power in the first write pulse only is increased instead of the width of the first write pulse.

FIG. 4(c) shows a pulse sequence 1.0-0.5(N-1) for writing a 6T mark at a channel-bit period of $T_2$ according to another embodiment. The first pulse has a width twice as long as that of the four subsequent pulses. The width of each of the subsequent pulses is equal to half a channel-bit period $T_1$. The subsequent pulses start at a transition of the data clock. The width of the periods in between subsequent pulses is substantially equal. The cooling period following the last pulse has a width of half a channel-bit period $T_w$.

It will be clear that the different embodiments of pulse sequences for writing a mark as described above can be used in the method according to the invention. The pulse pattern consisting of pulse widths and pulse periods is optimized at a certain speed, and subsequently adapted for writing at a different speed by changing the pulse periods in dependence on the speed and keeping the pulse widths at the same values.

In an embodiment of the recording method, a recording device starts a write action on an information carrier, for instance in the form of a disc, by first reading write parameters stored on the disc. One of these parameters is the write power required for this particular type of disc. Instead of starting to write at the inner radius of the disc, as is usually done on optical discs, the device will preferably first make a test run by writing marks near the outer radius, because the values of the write parameters are more critical near the outer radius than near the inner radius. The test run calibrates the write power of the device and determines the value of the pulse width $T_p$ for proper writing at the outer radius. The quality of the test marks can be assessed by measuring e.g. the jitter of the read signal from the marks. The assessment can also be made by counting errors detected by the error correction circuit which is normally present in each optical recording device. Optimization of the writing speed at a given maximum power of the radiation source leads in general to a write pulse width $T_p$ about equal to half the channel-bit period $T_w$ at the outer radius, i.e. $T_1$. FIGS. 1(a) and 1(d) shows the write pulse sequence near the outer radius, displaying a substantially 50% duty cycle control signal when writing a mark. The 50% duty cycle write pulse near the outer radius is a preferred value; the duty cycles may lie within a range from 40% and 60%. When writing at a different radius of the disc, only the channel-bit period $T_w$ must be adapted to the radius, or, equivalently, to the scanning speed according to the straight line or the stepped line in FIG. 2, while keeping the pulse width and the pulse power substantially constant.

In special cases an improvement of the recording method can be achieved by slightly increasing the write power at reducing writing speed. Experimentally it has been found for a specific information carrier that a decrease in write speed from 7.6 m/s to 3 m/s requires a write power increase from 10.5 to 13 mW. Hence, a decrease of the write speed by a factor of two and a half requires a 25% increase in the write power. On other information carriers a 10% increase has been measured for the same decrease in writing speed. On the information carrier several write power values for different radii on the disc may have been stored, either by the manufacturer of the medium or by a first user who has made test runs on the information carrier. The recording device can then interpolate between these values to obtain the optimum write power for any radius on the disc. The interpolation may be linear or order higher than one. The recording device can also make test recordings at various radii before each write session and determine the appropriate values of the parameters at each radius from these tests.

The recording method according to the invention is eminently suitable for recording marks on a phase-change information layer, especially for writing amorphous marks in a crystalline information layer. The short write pulses, especially at the inner radius of a disc, allow a proper control of the write process in view of the amorphization and recrystallization of the phase-change material.

The recording method according to the invention can also be used for recording data on different information carriers designed for different writing speeds, for instance because of different types of information layers in the discs. The pulse width is determined for the channel-bit period of the information carrier having the highest writing speed. When recording a disc at a lower writing speed, the pulse width is not changed, but only the channel bit period is increased in accordance with the specification of the information carrier. Hence, a recording device can record on different types of information carriers by merely changing the channel-bit period and, possibly, the write power.

FIG. 5 shows a recording device according to the invention. The data signal $S_D$ is connected to a control unit 1. A control signal $S_C$ provided at the output of the control unit 1 is connected to a radiation source 2. The control signal controls the power of a radiation beam 3 generated by the source. The radiation beam is focused by a lens 4 onto an information layer 5 of an information carrier 6 in the form of a disc. The information carrier is rotated at a constant angular velocity around its centre by a motor 7. When the radiation source 2 is displaced in a radial direction with respect to the disc, as indicated by arrow 8, the area of the information layer 5 can be irradiated by the beam 3. A position sensor 9 detects the radial position of the radiation beam, for instance by determining the radial displacement of the radiation source 2 or by deriving the position from signals read from the information layer. The position is fed into a clock generator 10, which generates a data clock signal $S_K$, the frequency of which increases with the radial distance of the radiation beam 3 from the centre of the disc 6. In general, the clock signal is derived from a crystal clock, for instance by dividing the crystal clock signal by a number dependent on the radial distance. The control unit 1 combines the data signal $S_D$ and the clock signal $S_K$ to the control signal $S_C$, e.g. by means of an AND gate, such that the control signal contains write pulses of substantial equal pulse width and equal power synchronized to the clock signal. The control unit may generate the pulses of equal width by means of a mono-stable multivibrator triggered by the data signal and the clock signal. The multivibrator has preferably an adjustable pulse width to allow for different lengths of the first and last pulse of a sequence for writing a mark. The number of write pulses is constant for a unit of length of a written mark. The control unit generates the same sequence of write pulses for writing a certain mark independent of the writing speed, only the rate at which the pulses are generated varies with the writing speed, i.e. with the radial position of the radiation beam.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

I claim:

1. The method of recording marks representing data, comprising irradiating an information layer of an optical information carrier by a pulsed radiation beam at different writing speeds wherein all pulses are of substantially equal pulse width and characterized by each recorded mark, regardless of writing speed, having a substantially constant number of pulses per unit length.

2. The method according to claim 1, characterized in that the pulses are synchronized to a data clock signal the frequency of which depends on the writing speed.

3. The method according to claim 1, characterized in that the power in the pulses is substantially equal to a predetermined level.

4. The method according to claim 1, characterized in that the power in the pulses increases with decreasing writing speed.

5. The method according to claim 1, characterized in that after at least one of the pulses the radiation power is set to a bias level which is lower than 70% of a predetermined erase level.

6. The method according to claim 5, characterized in that the radiation power is set to the bias level prior to the first pulse of a sequence of pulses for writing a mark.

7. The method according to claim 6, characterized in that the radiation power is changed from the erase level to the bias level at an instant one data clock period plus half a pulse width before the end of the first pulse of the sequence.

8. The method according to claim 1, characterized in that the radiation power is set to a bias level at the end of the last pulse of a sequence of pulses for writing a mark and subsequently, after a cooling period, to an erase level, which erase level is larger than the bias level.

9. The method according to claim 8, characterized in that the width of the cooling period is between ½ and 3/2 times the data clock period.

10. The method according to claim 1, characterized in that the radiation power immediately before the first pulse of a sequence of pulses for writing a mark is at an erase level, the erase level being smaller than the power level in the pulses.

11. The method according to claim 1, characterized in that the width of the first pulse of a series of pulses for writing a mark is substantially equal to twice the pulse width of the following pulses in the series.

12. The optical recording device for recording data in the form of marks on an information layer of an information carrier by irradiating the information layer by a radiation beam, the device comprising a radiation source providing the radiation beam and a control unit for controlling the power of the radiation beam according to a varying writing speed such that regardless of writing speed all recorded marks have about the same predetermined number of pulses per unit length with substantially all pulses being of a substantial equal pulse width and having a pulse period based on the varying writing speed.

13. The optical recording device according to claim 12, characterized in that the device comprises a clock generator for providing at an output a data clock signal determining the writing speed of the marks, the output of the clock generator being connected to the control unit for controlling the pulse period in accordance with the data clock signal.

* * * * *